(12) United States Patent
Yamashita et al.

(10) Patent No.: US 6,772,874 B2
(45) Date of Patent: Aug. 10, 2004

(54) ROLLER CONVEYOR

(75) Inventors: Yoshikazu Yamashita, Yokohama (JP); Hisato Saida, Yaizu (JP); Hiroyuki Harada, Yaizu (JP)

(73) Assignee: Okamura Corporation (JP)

( * ) Notice: Subject to any disclaimer, the term of this patent is extended or adjusted under 35 U.S.C. 154(b) by 5 days.

(21) Appl. No.: 10/352,434

(22) Filed: Jan. 28, 2003

(65) Prior Publication Data

US 2003/0141170 A1 Jul. 31, 2003

(30) Foreign Application Priority Data

| Jan. 30, 2002 | (JP) | 2002-021263 |
| Jan. 30, 2002 | (JP) | 2002-021264 |
| Sep. 25, 2002 | (JP) | 2002-278909 |
| Sep. 25, 2003 | (JP) | 2002-278908 |

(51) Int. Cl.$^7$ .............................................. B65G 13/06
(52) U.S. Cl. ............................ 198/781.03; 198/781.02
(58) Field of Search ........................ 198/781.02, 781.03, 198/781.08, 781.09, 781.1

(56) References Cited

U.S. PATENT DOCUMENTS

| 4,063,636 A | * | 12/1977 | vom Stein | 198/781.02 |
| 4,269,305 A | * | 5/1981 | Fryatt | 198/781.1 |
| 4,362,238 A | * | 12/1982 | Rivette | 198/781.1 |
| 5,147,024 A | * | 9/1992 | Yamada | 198/781.02 |

FOREIGN PATENT DOCUMENTS

| DE | 2742579 | * | 3/1979 | 198/781.03 |
| GB | 2219781 | * | 12/1989 | 198/781.1 |
| GB | 2241931 | * | 9/1991 | 198/781.03 |

* cited by examiner

Primary Examiner—James R. Bidwell

(57) ABSTRACT

Materials are conveyed by a roller conveyor which comprises a pair of conveyor frames and a plurality of rollers rotatably mounted between the pair of conveyor frames. The roller comprises a roller body and a driving force receiver connected to a motor. When the driving force receiver is driven, the roller body is driven and rotated by engagement of the driving force receiver and the roller body. When the roller stops, the roller body is disengaged from the drivng force receiver and becomes freely rotatable in either direction.

22 Claims, 8 Drawing Sheets

ROLLER CONVEYOR

BACKGROUND OF THE INVENTION

The present invention relates to a roller conveyor, and especially a roller conveyor in which a plurality of rollers between a pair of conveyor frames are driven by rotation driving means so that materials may be conveyed.

A roller conveyor for conveying materials on rollers is known in FIG. 8, which is a sectional view of a roller 101 between a pair of conveyor frames. In a roller body 102 for conveying materials, a driving force is connected and disconnected by a sprocket 103 driven by separate rotation driving means (not shown) via a pneumatic clutch mechanism 104.

The pneumatic clutch mechanism 104 comprises a tubular member 107 which is rotatably mounted to a roller shaft 105 via a bearing 106, and an elastic tube 108 between the tubular member 107 and the roller body 102. The elastic tube 108 is expanded by air pressure introduced through a conduit 105a in the roller shaft 105, and an outer surface 103A at one end of the sprocket 103 is connected with an inner surface 102A of the roller body 102 via the elastic tube 108. Thus, when the pneumatic clutch mechanism 104 is actuated, a rotational force of the sprocket 103 is transmitted to the roller body 102. To stop rotation of the roller body 102, air supplied into the elastic tube 108 is exhausted by switching of a valve.

To control driving and stop of a roller body in a roller conveyor, a linear motor is also known, in which a roller body has a magnetic material and a plurality of driving coils by which N- and S-pole magnetic fluxes can be ejected on a floor.

However, in a device which comprises the pneumatic clutch mechanism 104 as shown in FIG. 8, it is necessary to control supply and exhaustion of air in each of the roller bodies depending on connection and disconnection of driving force to the roller bodies. Therefore, it is necessary to provide conduits or supply/exhaution control valve to make a system itself complicate.

In the linear motor, owing to difference of driving system, it is not possible to use known driving force transmission means, such as a belt and a chain, which not only lead increase in cost but also require control means for switching a magnetic flux signal to each of the rollers to drive and stop the roller bodies.

In the meantime, there are a two types of roller conveyors in FIGS. 9a and 9b. In FIG. 9a, 201 denotes a rotary shaft driven by a motor and has a plurality of driving pulleys 203 fixed thereon, corresponding to rollers 202. A belt 204 is provided between the driving pulley 203 and the roller 202, and the roller 202b is driven by the rotary shaft 201 via the belt 204 to convey materials "A", "B", "C", "D".

FIG. 9a illustrates eighteen rolls from 202-a to 202-r, and each four rolls are simultaneously braked. Four rolls 202-a, 202-b, 202-c, 202-d are braked by a brake 205-1. Next four rolls 202-e to 202-h are braked by a brake 205-2 as well. Therefore, the materials "A" and "B" stop. On the contrary, the remaining rolls 202-l to 202-r are not braked since brakes 205-3, 205-4 are lower, so that the materials "C" and "D" are conveyed.

In the roller conveyor in FIG. 9b, a belt 208 is turned by rotation of a drive pulley 207, and a plurality of rollers 209 which are frictionally engaged on the belt 208 are rotated by rotation of the belt 208. Frictional engagement and disengagement between the belt 208 and the roller 209 are controlled by a clutch roll 210. As shown in FIG. 7b, the clutch rolls 210-1 and 210-2 are disposed at lower position, and the belt 208 is not engaged with the roller 209. The rollers 209-a to 209-i are disengaged from the rotation driving means 207, 208 and therefore act as free rollers which are freely rotatable in either direction. The remaining rollers 209-j to 209-r which are contacted on the belt 208 can be driven since clutch rolls 210-3, 210-4 are disposed at higher position. In this situation, the clutch roll 210-3 is lowered and disengaged from the belt 208, so that the material "D" is rolled on the rollers which are freely rotatable and can be arranged to contact the rear end of stopped material "C".

However, in the roller conveyor as shown in FIG. 9a, when the brake 205 is actuated, the roller 202 stops after it rotates by inertia force, so that the material "C" and "D" go forward to "C'" and "D'" which stop. The materials "A", "B", "C", "D" are arranged with spaces, so that they are not able to be arranged in forward-contacted position.

In the roller conveyor as shown in FIG. 9b, the roller 209 can be shifted to a driving or free roll by action of the clutch roll 210, so that a material can be arranged to contact the rear end of stopped material. However, the belt 208 must be driven by full power and it is necessary to provide a conveyor belt having length corresponding to conveying distance of the roller conveyor.

SUMMARY OF THE INVENTION

In view of the foregoing disadvantages, it is an object of the present invention to provide a roller conveyor which allows driving and stopping of a roller body without special equipment or control means, the roller conveyor being functioned as a free roller rotatable in either direction when a roller body stops.

It is another object of the present invention to provide a roller conveyor which is easily variable in length and can be readily shifted between driving and free conditions, conveyed materials being able to be arranged in forward-contact position.

In order to achieve the objects, according to one aspect of the present invention, there is provided a roller conveyor comprising:

a pair of conveyor frames;

a plurality of rollers which are rotatably mounted between said pair of conveyor frames; and rotation driving means for driving a roller or a set of rollers in the plurality of rollers to-convey materials, the roller or the set of rollers being able to be transformed to a free roller or rollers which are rotatable in either direction by an external force when said rotation driving means stop.

According to another aspect of the present invention, there is provided a roller conveyor comprising:

a pair of conveyor frames;

a plurality of rollers which are rotatably mounted between said pair of conveyor frames; and rotation driving means for driving the rollers to covey materials, each of the rollers comprising a roller body which is rotatably mounted on a stationary roller shaft, and a driving force receiver which receives a rotational force from said rotation driving means, said roller conveyor further comprising driving force transmitting means for transmitting said rotational force to said roller body only when said driving force receiver receives the rotational force.

BRIEF DESCRIPTION OF THE DRAWINGS

The features and advantages of the invention will become more apparent from the following description with respect to embodiments as shown in appended drawings wherein.

DETAILED DESCRIPTION OF PREFERRED EMBODIMENTS

Figure 1:
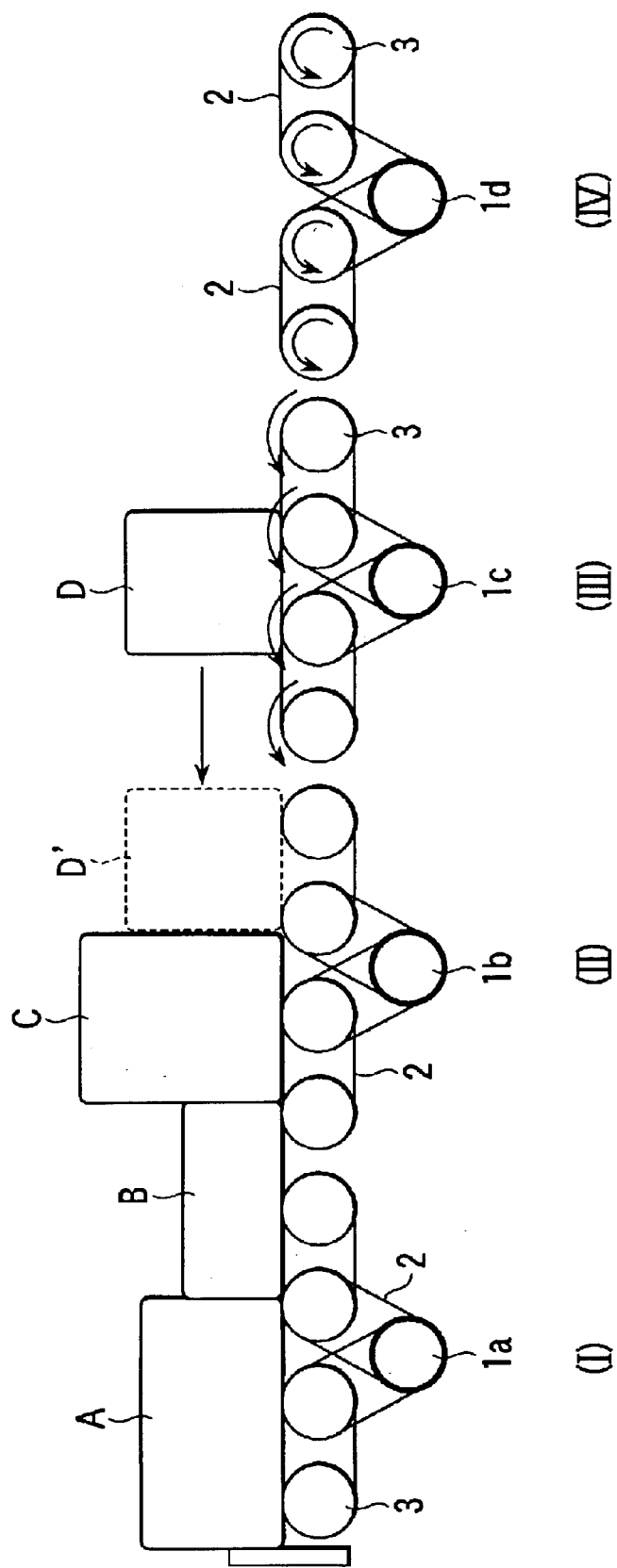
FIG. 1 is a schematic view of a roller conveyor according to the present invention.

FIG. 1 illustrates a roller conveyor according to the present invention. There are four groups, I to IV, and in each of the groups I to IV, four drive belts 2 are wound around a single motor 1a, 1b, 1c, 1d so that the single motor 1a, 1b, 1c, 1d may rotate four rollers 3 simultaneously.

With respect to the first group, the four rollers 3 are rotated by the motor 1a via the drive belts 2. So materials "A" and "B" on the rollers 3 can be conveyed. However, when the motor 1a stops, a rotational force is not transmitted to the roller 3. The roller 3 is completely separated from rotation drive means 1a, 2 and acts as a free roller. Therefore, if the motor 1a stops, the material "A" can be manually conveyed freely in either direction. So, as shown in FIG. 1, the motors 1a, 1b stop, and the materials "A", "B", "C" are manually arranged in forward-pushed position. Thereafter, the motor 1c is stopped, and the materials "D" are moved to a position "D'". Thus, the materials "A" to "D" can be arranged in forward-pushed position. A transmission rope may be employed instead of a drive belt.

Figure 2:
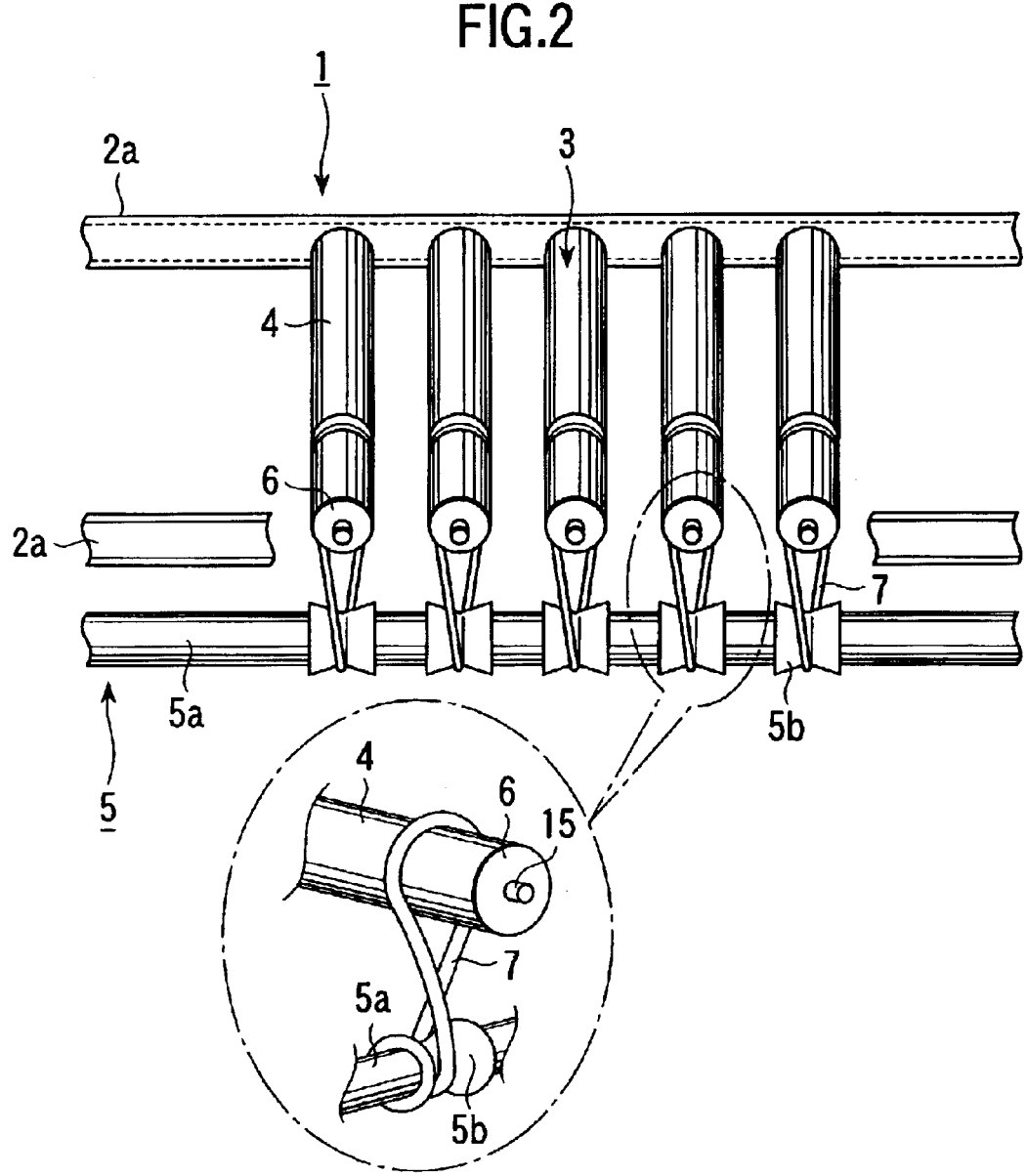
FIG. 2 is a perspective view of a roller conveyor and partially enlarged view of a roller conveyor according to the present invention.

Instead of the roller conveyor in FIG. 1, FIG. 2 is a perspective view of another type of roller conveyor 1. The roller conveyor 1 comprises a roller 3 between a pair of conveyor frames 2a,2a, and the roller 3 comprises a roller body 4 for conveying material, and a driven portion 6 which receives rotation drive force from a rotation drive member 5 driven by a motor. The roller body 4 and driven portion 6 are axially mounted to a fixed roller shaft 15 between a pair of conveyor frames 2a,2a.

The drive member 5 has a belt 7 between the driven portion 6 and a pulley 5b which rotates together with a rotary shaft 5a so that the roller 3 may rotate by the single rotary shaft 5.

Figure 3A:
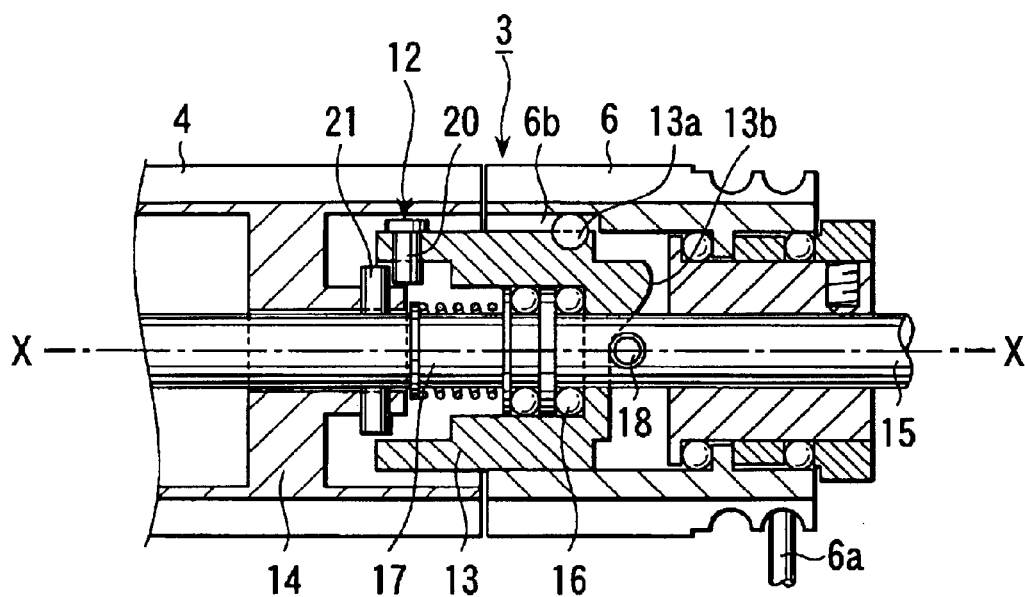
FIG. 3a is a partially sectional view which illustrates that the roller stops without transmitting a rotational force to a driving force receiver.
Figure 3B:
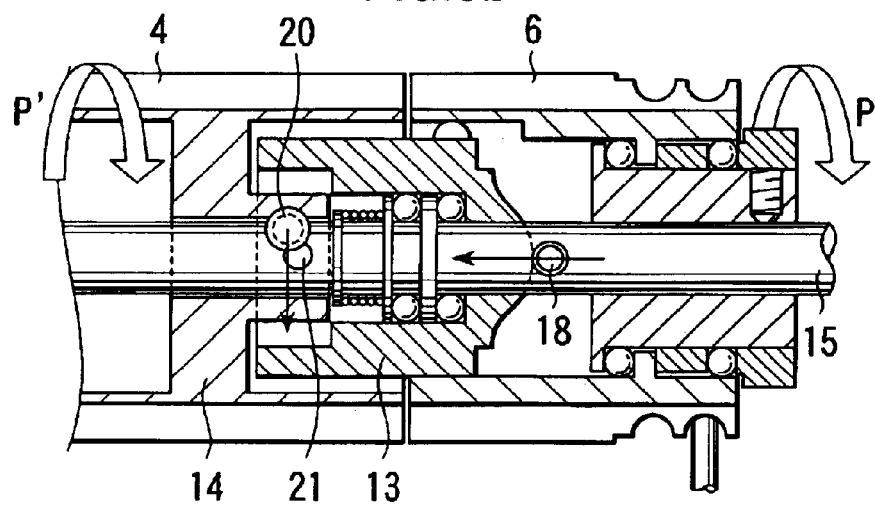
FIG. 3b is a partially sectional view which illustrates that the roller drives by transmitting the rotational force to the driving force receiver.
Figure 3C:
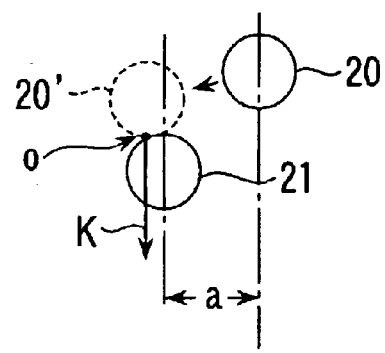
FIG. 3c is a detailed view which illustrates that the driving force is connected and released by a pin.

The structure and function of a roller in which a drive roller is shifted to a free roller depending on drive situation from rotation drive means will be described with respect to FIGS. 3a, 3b and 3c. FIG. 3a illustrates that the roller stops, FIG. 3b illustrates that rotational force is transmitted, and FIG. 3c illustrates that a driving force is connected and released by a pin.

In FIG. 3a, a roller 3 between a pair of conveyor frames (not shown) comprises a roller body 4 which is rotatable on a roller shaft 15 to convey materials; and a drive force receiver 6 which receives a rotational force from suitable rotation drive means driven by a motor.

The rotational force received by the rotational force receiver 6 via a transmission rope 6a is transmitted to the rotational body via a rotational force transmission means 12. The rotational force transmission means 12 comprises a mover 13 between the drive force receiver 6 and the roller body 4, and a receiver 14 which rotates together with the roller body 4.

A ball 13a on the outer circumferential surface of the mover 13 is engaged in a groove 6b on the inner surface of the drive force receiver 6 such that rotation of the drive force receiver 6 is transmitted to the mover 13 and the ball 13a is moved along an axis X—X. The inside of the mover 13 is rotatably mounted on a bearing 16 of the roller shaft 15 fixed to a conveyor frame.

The bearing 16 is slidably provided on the roller shaft 15, and is always energized by a return coiled spring 17 in a right-hand direction in FIG. 3a. Thus, in a stopping situation where rotational force is not transmitted to the drive force receiver 6, the mover 13 is energized in a right-hand direction via the bearing 16, so that an inclined cam surface 13b on the right end face of the mover 13 is engaged on a pin 18 projected on the roller shaft 15.

As shown in FIG. 3c, a mover pin 20 of the mover 13 near the receiver 14 perpendicular to the axis X—X is axially spaced by a predetermined distance "a" from a receiver pin 21 of the receiver 14 near the mover 13 perpendicular to the axis X—X.

From the stopping situation in FIG. 3a wherein power is not transmitted to the driving force receiver 6, a driving force is transmitted to the transmitting rope 6a, and the driving force receiver 6 is turned, for example, in a direction of an arrow "P" as shown in FIG. 3b, so that the mover 13 is turned via the ball 13a in the same direction while an inclined cam surface 13b of the mover 13 is engaged on the pin 18. Thus, owing to the cam shape of the inclined cam surface 13, the mover 13 goes forward the receiver 14 along the axis X—X while compressing the return coiled spring 17.

The mover 13 goes forwards to the receiver 14 while rotating and the inclined cam surface 13b reaches to the top dead point. Then the mover pin 20 moves to a dotted circle 20' in FIG. 3c, and linearly contacts the receiver pin 21 of the receiver 14 at a point "o". At this position, the pins 20 and 21 are contacted with each other. In the driving force receiver 6, a rotational force "K" is generated in the receiver 14 via the pins 20, 21, and is transmitted, rotating in a direction "P'" the same as the direction "P" in the roller body 4 fixed to the receiver 14. Such drive connection between the pins assures reliable transmission of the driving force.

When the driving force receiver 6 is turned by the transmitting rope 6a, the driving force is automatically transmitted to the roller body 4 via the driving force transmitting means 12, thereby conveying the material on the roller body 4.

In the meantime, when the driving force from the transmitting rope 6a is ceased and is not transmitted to the driving force receiver 6, an axial thrust force of the mover 13 generated by component of the rotation driving force "K" is overcome by a force of the coiled spring 17 and the mover 13 goes back towards the driving force receiver 6.

When the mover 13 goes back, the mover pin 20 goes back to disengage from the receiver pin 21 and to return to the original position spaced by the distance "a". Therefore, the roller body 4 is disconnected from the driving force receiver 6 and is freely rotatable in any directions. So, when the material is moved to a predetermined position by turning the roller body and arranged at the front end during accumulation, rotational resistance is not applied to the roller body 4 to enable easy operation. By changing cam shape of the inclined cam surface 13b, axial motion of the roller body can be easily changed to rotation of the mover.

Figure 4A:
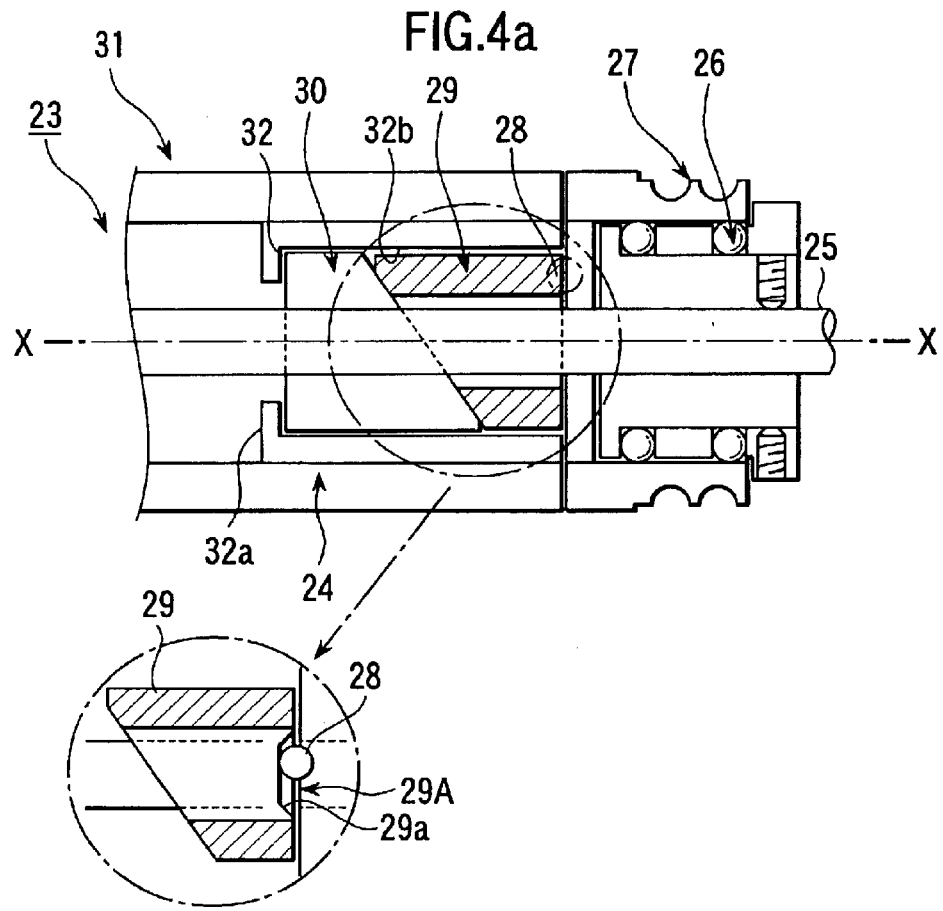
FIG. 4a is a partially sectional view of driving force transmitting means in a roller of the second embodiment of a roller conveyor according to the present invention.
Figure 4B:
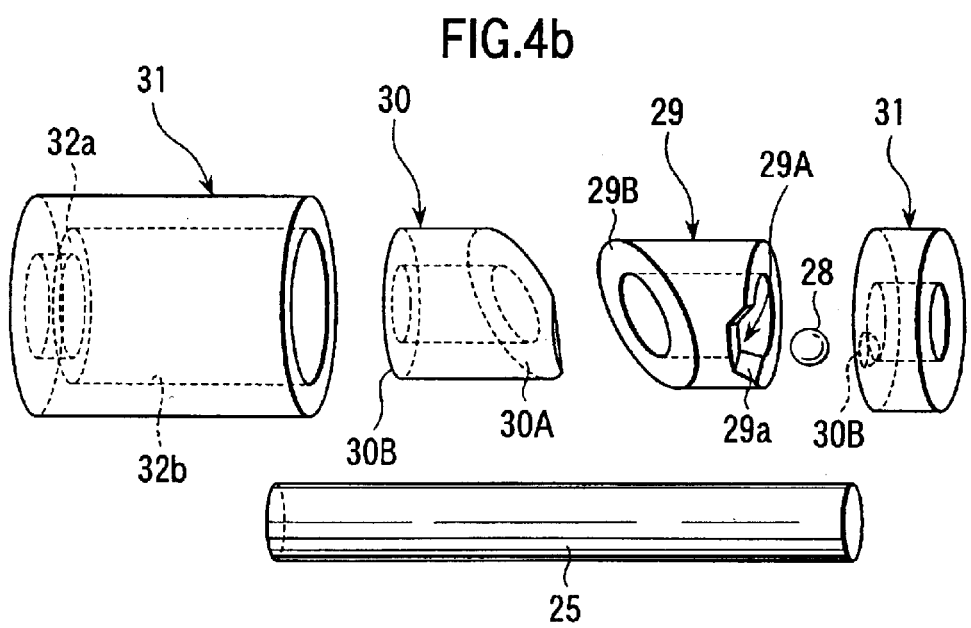
FIG. 4b is an exploded perspective view thereof.

FIGS. 4a and 4b illustrate detailed views of driving force transmitting means 24 in a roller 23 of a roller conveyor according to the second embodiment of the present invention. FIG. 4a is a sectional view and a partially detailed sectional view seen at another angle. FIG. 4b is an exploded perspective view, and the structure and function of the driving force transmitting means 24 will be described with respect to FIGS. 4a and 4b.

In FIG. 4a, a driving force receiver 27 is rotatably mounted to one end of a stationary roller shaft 25 via a bearing 26. On the front end face of the driving force receiver 27, a ball receiver 27a for receiving a ball 28 is formed and the ball 28 rotates with rotation of the driving force receiver 27.

The ball 28 is received in a recess 29A on the end of the mover 29, and as shown in FIG. 4b, the other end face 29B of the mover 29 is inclined with respect to an axis of the roller. The end face 29B faces an inclined surface 30A of the receiver 30 inclined at the same angle. The other end face 30B of the receiver 30 is engaged on an end face 32a of a stopper 32 so that forward motion thereof may be limited.

Then, with respect to operation of the driving force transmitting means 24, when rotation driving force is applied to the driving force receiver 27, rotation of the driving force receiver 27 is transmitted to the ball 28, which is put on an inclined portion 29a of the recess 29A of the mover. Because the driving force receiver 27 does not axially move, the mover 29 axially moves towards the receiver 30, so that the inclined surface 29B of the mover 29 frictionally contacts the inclined surface 30A. The driving force of the receiver 30 can be transmitted by frictional engagement of the inclined surfaces, and an eccentric force is not applied to the receiver 30, thereby assuring smooth transmission of the driving force.

The ball 28 can be readily put on the inclined portion 29a of the recess 29A, so that less rotation of the mover 29 can be surely transferred into axial motion. Since the receiver 30 is not moved by the stopper 32, the other end face 30B of the receiver 30 is strongly in frictional contact with the end face 32a of the stopper 32, thereby transmitting rotation driving force of the driving force receiver 27 to the roller body 31.

When the mover 29 is strongly pushed in an axial direction, the mover 29 and the receiver 30 move in an outer radial direction along the inclined surface to contact an inner circumferential surface 32b of the stopper 32 to transmit driving force at the portion.

Rotation driving force is not applied to the driving force receiver 27 to stop rotation, and the ball 28 is received in the recess 29A again to release an axial force applied to the mover 29. Owing to the release of the axial force, the receiver 30 and the mover 29 are disengaged from the stopper 32, so that rotation driving force is not transmitted to the roller body 31. There is nothing for binding rotation of the roller body 31, which is freely rotatable in either direction.

Figure 5:
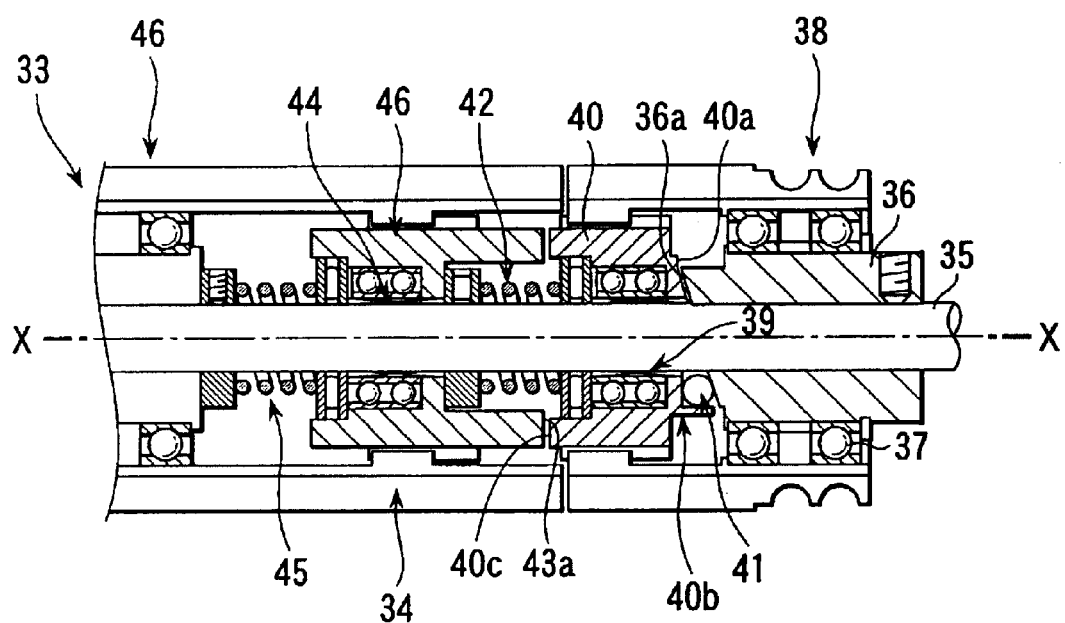
FIG. 5 is a sectional view of driving force transmitting means in a roller of the third embodiment of a roller conveyor according to the present invention.

FIG. 5 illustrates a sectional view of driving force transmitting means 34 in a roller of the third embodiment of a roller conveyor according to the present invention, and the driving force transmitting means 34 will be described with respect to FIG. 5.

In FIG. 5, a stationary roller shaft 35 has a stationary collar 36 which has an inclined surface at one end, and a driving force receiver 38 is rotatably supported around the roller shaft 35 via bearings 37 on the stationary collar 36. A mover 40 is in spline engagement with the driving force receiver 38 so as to rotate together with the driving force receiver 38 via bearings 39 and to make forward motion in a direction of an axis X—X.

The stationary collar 36 has an inclined surface 36a at the same angle as that of an inclined surface 40a. A ball 41 is put in a ball pocket 40b of the inclined surface 40a. The mover 40 is rotated by driving force of the driving force receiver 38, so that the ball 41 rotates together with the mover 40, thereby allowing the mover 40 to move back and forth and to rotate while a coiled spring 42 is intermittently compressed.

The back-and-forth motion of the mover 40 is transmitted to the receiver 43, and an end face 40 of the mover frictionally contacts an end face 43a of the receiver 43, so that rotation and axial motion of the mover 40 are transmitted to the receiver 43. Therefore, while a pushing coiled spring 45 is intermittently compressed by rotating the receiver 43 via bearings 44, the receiver 43 moves back and forth. Frictional force between the end faces 40c and 43a can be optionally determined by a spring force of the pushing coiled spring 45. Owing to spline engagement of the receiver 43 with the roller body 46, rotation of the receiver 43 rotationally drives the roller body 46.

Rotation of the driving force receiver 38 stops and the mover 49 goes back by the return coiled spring 42. The frictional force between the end faces 40c and 43a is released, allowing rotational force towards the roller body 46 to cease. The roller body 46 is freely rotatable in either direction. Therefore, another conveyed material can be manually arranged in forward-contacted position to contact the rear end of conveyed material disposed on the roller 33.

Figure 6:
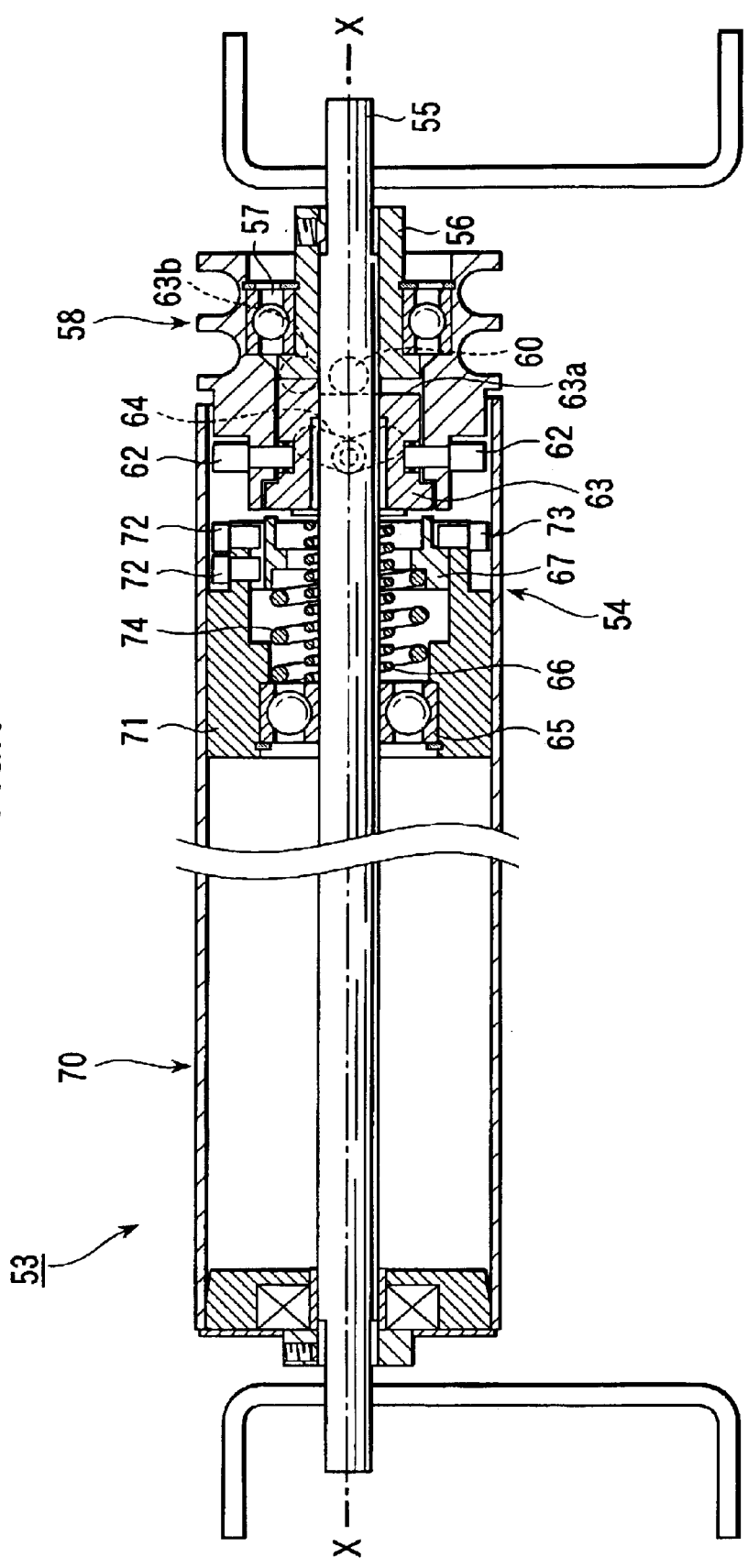
FIG. 6 is a sectional view of driving force transmitting means in a roller of the fourth embodiment of a roller conveyor according to the present invention.
Figure 7:
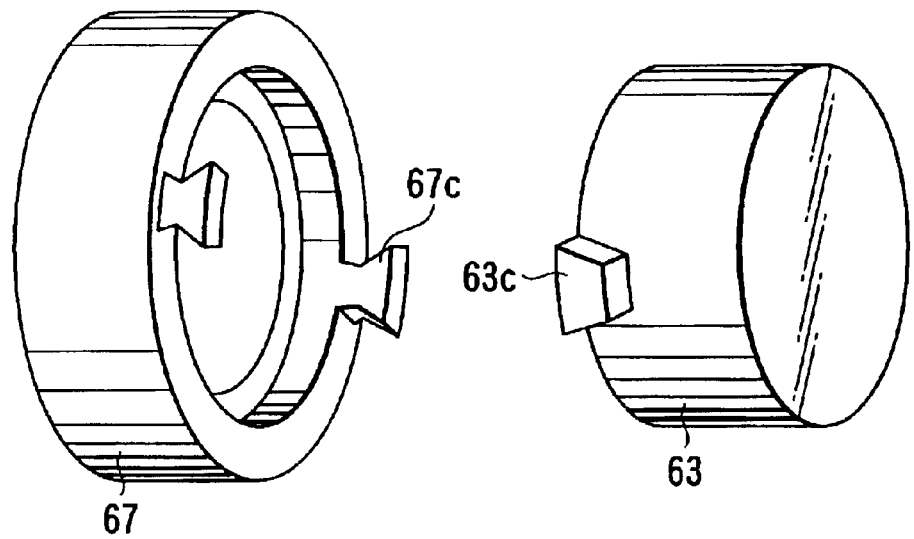
FIG. 7 is an exploded perspective view of a pair of clutches which constitutes driving force transmitting means used in the fourth embodiment of the present invention.
Figure 8:
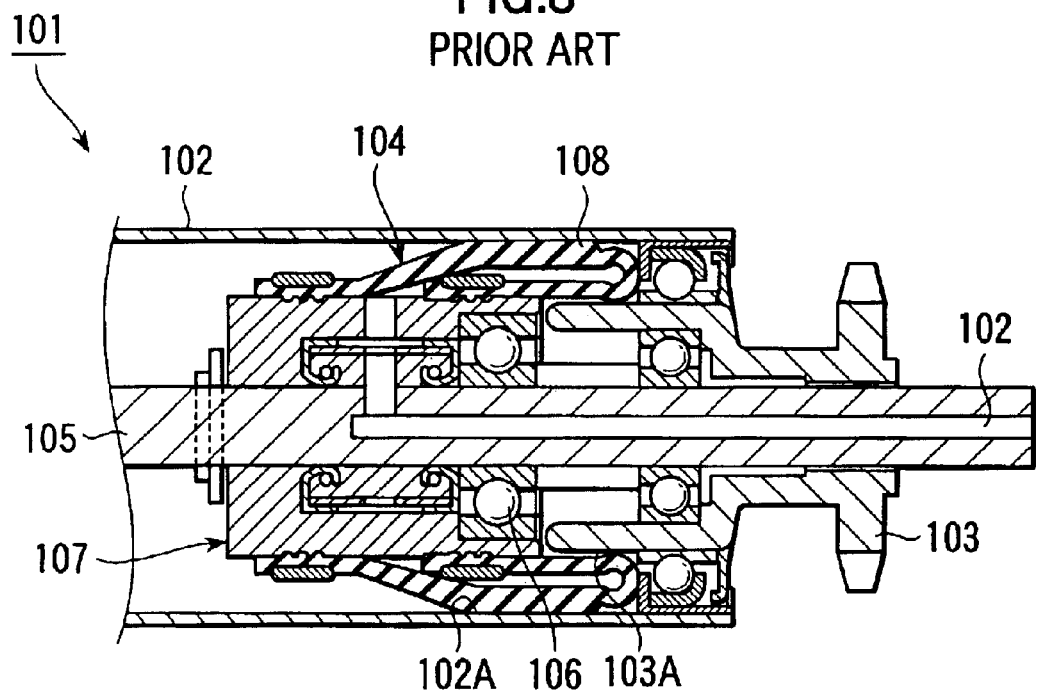
FIG. 8 is a sectional view of a known roller between a pair of conveyor frames.
Figure 9A:
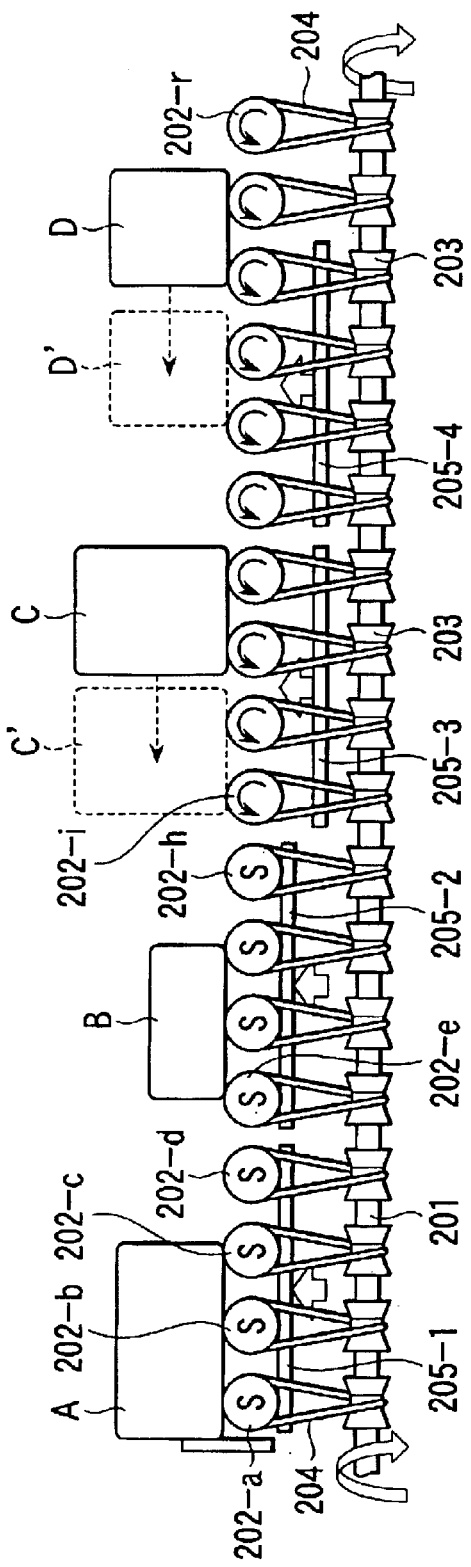
FIG. 9a is a schematic view of a known roller conveyor.
Figure 9B:
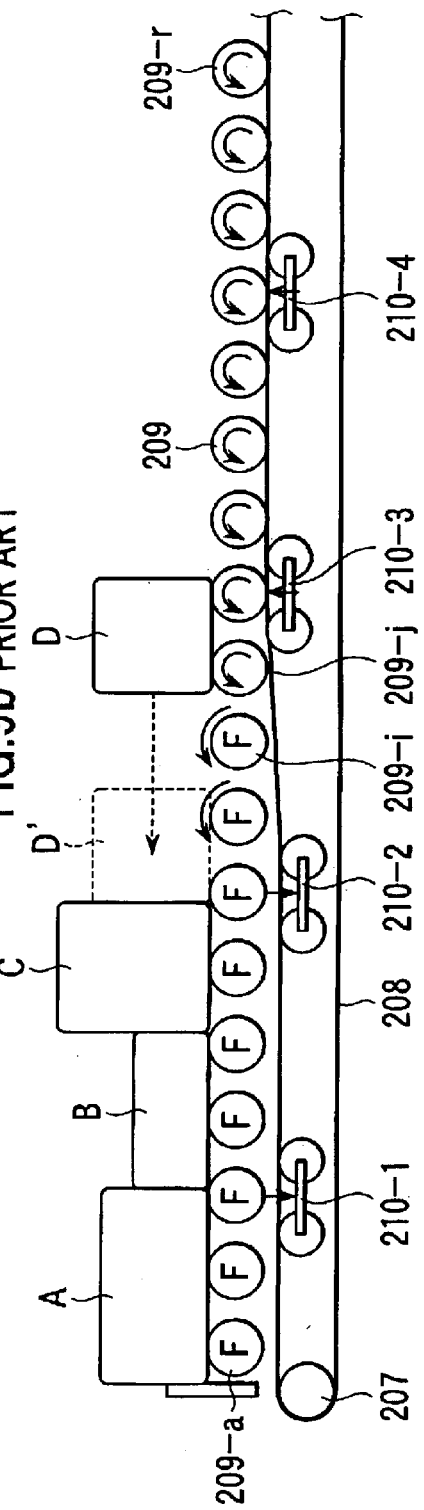
FIG. 9b is a schematic view of another known roller conveyor.

FIG. 6 illustrates a sectional view of driving transmitting means 54 in a roller 53 of the fourth embodiment of a roller conveyor according to the present invention, and FIG. 7 illustrates a partial perspective view of a pair of clutches which constitute the driving force transmitting means 54 used in the fourth embodiment.

In FIG. 6 in which the driving force transmitting means 54 which has a pair of clutches (which will be described in detail later), a stationary collar 56 is fixed to one end of a stationary roller shaft 55, and a driving force receiver 58 is rotatably mounted to the stationary collar 56 via bearings 57.

On the front end face of the stationary collar 56 (A front side is determined at the left side in FIG. 5.), there is formed a ball-receiving seat which receives a ball 60.

On the end of the driving force receiver 58, four pins 62 perpendicular to an axis X—X are equally spaced circumferentially and slidably engaged in four grooves 64 of a moving clutch 63 respectively.

A partially-inclined projection 63b is formed on a rear end face 63a of a mover clutch 63, which rotates once, so that the inclined projection 63b is put on the ball 60 of the stationary collar 56 so as to move the clutch 63 forwards.

When the inclined projection 63b is disengaged from the ball 60, the mover clutch 63 returns to the original position by a spring 66 disposed between a bearing 65 and the mover clutch 63. Therefore, during rotation of the driving force receiver 58, the mover clutch 63 periodically repeats cranking motion at close distance while it rotates with respect to a receiver clutch 67.

The groove 64 is inclined to prevent the pin 62 from disengagement, and expands rearwards so that the driving force receiver 58 may fit with both clockwise and anti-clockwise rotations. FIG. 7 illustrates engagement between the mover clutch 63 and the receiver clutch 67. The mover clutch 63 has a pair of engagement teeth 63c, and the receiver clutch 67 has a pair of engagement teeth 67c which is engagable with the engagement teeth 63c. When the mover clutch 63 makes cranking motion, the teeth 63c can be engaged with the teeth 67c.

When the teeth 63c are engaged with the teeth 67c, the mover clutch 63 is prevented from going back so far as rotation driving force acts by the engagement of the teeth, and rotational force is transmitted to a roller body 70 via the receiver clutch 67. A bearing support 71 is fixed to the roller body 70, and the roller body 70 is rotatably supported to the roller shaft 55 via the bearing support 71 and bearing 65.

Keyways are axially formed on the receiver clutch 67, and pins 72,73 of the bearing support 71 are engaged in the keyways. A spring 74 is provided between the receiver clutch 67 and the bearing 65 to energize the receiver clutch 67 any time towards the mover clutch 63, but the spring 74 is prevented by the pin 73 from coming out.

By such structure, even if the mover clutch 63 fails to connect the receiver clutch 67 by contacting the teeth 63c with the end face of the teeth 67c, the receiver clutch 67 can go back towards the front or left side to avoid high collision sound.

As a result of cranking motion several times, the teeth 63c are engaged with the teeth 67c, so that the receiver clutch 63 is prevented from going back. The mover clutch 63 is driven by engagement of the four pins 62 with rear sides of the grooves 64 to drive the receiver clutch 67 via the teeth 63c,67c to drive the roller body 70 via the pins 72,73.

By ceasing rotational force of the driving force receiver 58, the spring 66 acts to the mover clutch 63, so that the teeth 63c is disengaged from the teeth 67c, and the mover clutch 63 comes back to an original position while rotating. Then, the roller body 70 becomes freely rotatable by an external force, and another material can be manually moved and arranged to contact the rear end of the material already disposed.

According to the fourth embodiment of the present invention, axial motion of the mover clutch 63 and transmission of driving force are made by the ball 60 and the pin 62 respectively, thereby increasing durability of the driving force transmitting means 54. Also, a driving force is transmitted by teeth engagement to attain reliable torque transmission.

As mentioned above, the rollers 3, 23, 33, 53 used in the roller conveyor according to the present invention comprise the roller bodies 4, 31, 46, 70 and the driving force receivers 6, 27, 38, 58. Only when the driving force receivers 6, 27, 38, 58 receive rotational force, the driving force can be transmitted by the rotational force to the roller bodies 4, 31, 46, 70. When rotation of the driving force receivers 6, 27, 38, 58 stop, the roller bodies 4, 31, 46, 70 can become free rollers that are freely rotatable by an external force.

Therefore, driving and free-rotating can be readily switched and the conveyed materials can be arranged by a simple mechanism at front filling condition. Even if conveying length of the roller conveyor is changed, the rollers which have driving force transmitting means may be increased or decreased depending on the conveying length.

The embodiments according to the present invention are described with respect to the drawings, but are not merely limited thereto. To drive the rollers by a motor, instead of a system for driving several rollers by a single motor, a single roller may be driven by one motor.

To move the mover axially, any conventional mechanism for transferring rotation into axial motion may be applied.

The foregoing merely relate to embodiments of the invention. Any changes and modifications may be made by a person skilled in the art without departing from the scope of claims wherein:

What is claimed is:

1. A roller conveyor comprising:

a pair of conveyor frames;

a plurality of rollers which are rotatably mounted between said pair of conveyor frames;

rotation driving means for driving a roller or a set of rollers in said plurality of rollers to convey materials, the roller or said set of rollers being able to be transformed to a free roller or rollers which are rotatable in either direction by an external force when said rotation driving means stop;

wherein said roller comprises a roller body which is rotatably mounted to a stationary roller shaft, and a driving force receiver which receives a rotational force by the rotation driving means, said roller conveyor further comprising driving force transmitting means for transmitting the rotational force to said roller body only when the driving force receiver receives the rotational force;

wherein said driving force transmitting means comprises a mover which moves axially of said roller by the rotational force from said driving force receiver, and a receiver connected to the roller body to rotate the roller body by motion of said mover; and said mover has a mover pin projected perpendicular to an axis of the roller, said receiver having a receiver pin perpendicular to the axis of the roller, said receiver being driven by said mover by engagement of the mover pin with the receiver pin.

2. A roller conveyor as claimed in claim 1 wherein the mover has an inclined cam surface at a rear end, the roller shaft having a roller pin, a return coiled spring being wound around the roller shaft, said inclined cam surface being engaged on the roller pin by rotation of the driving force receiver and the mover which rotates therewith, thereby converting the rotation to forward motion to compress said spring to engage the mover pin with the receiver pin.

3. A roller conveyor comprising:

a pair of conveyor frames;

a plurality of rollers which are rotatably mounted between said pair of conveyor frames;

rotation driving means for driving a roller or a set of rollers in said plurality of rollers to convey materials, the roller or said set of rollers being able to be transformed to a free roller or rollers which are rotatable in either direction by an external force when said rotation driving means stop;

wherein said roller comprises a roller body which is rotatably mounted to a stationary roller shaft, and a driving force receiver which receives a rotational force by the rotation driving means, said roller conveyor further comprising driving force transmitting means for transmitting the rotational force to said roller body only when the driving force receiver receives the rotational force;

wherein said driving force transmitting means comprises a mover which moves axially of said roller by the rotational force from said driving force receiver, and a receiver connected to the roller body to rotate the roller body by motion of said mover; and wherein the mover has a front inclined surface, the receiver having a rear inclined surface at the same angle as the front inclined surface of the mover, the front and rear inclined surfaces being opposite to each other, the receiver being driven by the mover by frictional engagement of the front and rear inclined surfaces.

4. A roller conveyor as claimed in claim 3 wherein a rolling material is disposed between the driving force receiver and the mover which has a recess which has an inclined portion, the rolling material being received in the recess, rotation of the driving force receiver causing putting the rolling material on the inclined portion of the recess to convert the rotation into forward motion of the mover to lead frictional engagement with the receiver through the two inclined surfaces.

5. A roller conveyor as claimed in claim 4 wherein said rolling material comprises a ball.

6. A roller conveyor comprising:

a pair of conveyor frames;

a plurality of rollers which are rotatably mounted between said pair of conveyor frames;

rotation driving means for driving a roller or a set of rollers in said plurality of rollers to convey materials, the roller or said set of rollers being able to be transformed to a free roller rollers which are rotatable in either direction by an external force when said rotation driving means stop;

wherein said roller comprises a roller body which is rotatably mounted to a stationary roller shaft, and a driving force receiver which receives a rotational force by the rotation driving means, said roller conveyor further comprising driving force transmitting means for transmitting the rotational force to said roller body only when the driving force receiver receives the rotational force;

wherein said driving force transmitting means comprises a mover which moves axially of said roller by the rotational force from said driving force receiver, and a receiver connected to the roller body to rotate the roller body by motion of said mover; and wherein a stationary collar is fixed to the stationary roller shaft, an inclined surface of the mover being contacted with an inclined surface of the stationary collar via a rolling material in a pocket of the mover, the two inclined surfaces having the same angle, the mover being in spline engagement with the driving force receiver, the stationary collar being disposed in the driving force receiver via bearings, the receiver being in spline contact with the roller body, rotation of the driving force receiver being converted into forward motion of the mover by the rolling material between the two inclined surfaces, rotation of the roller body being caused by frictional contact between the mover and the receiver.

7. A roller conveyor as claimed in claim 6 wherein a return coiled spring is wound around the stationary roller shaft, frictional contact between the mover and the receiver being released by stop of the driving force receiver through the spring, thereby making the roller body rotatable freely.

8. A roller conveyor as claimed in claim 6 wherein said rolling material comprises a ball.

9. A roller conveyor comprising:

a pair of conveyor frames;

a plurality of rollers which are rotatably mounted between said pair of conveyor frames;

rotation driving means for driving a roller or a set of rollers in said plurality of rollers to convey materials, the roller or said set of rollers being able to be transformed to a free roller or rollers which are rotatable in either direction by an external force when said rotation driving means stop;

wherein said roller comprises a roller body which is rotatably mounted to a stationary roller shaft, and a driving force receiver which receives a rotational force by the rotation driving means, said roller conveyor further comprising driving force transmitting means for transmitting the rotational force to said roller body only when the driving force receiver receives the rotational force;

wherein said driving force transmitting means comprises a mover which moves axially of said roller by the rotational force from said driving force receiver, and a receiver connected to the roller body to rotate the roller body by motion of said mover; and wherein said mover and said receiver comprise a mover clutch and a receiver clutch respectively, said receiver clutch being driven by said move clutch with engagement of teeth provided on opposing ends of the mover and receiver clutches respectively.

10. A roller conveyor as claimed in claim 9 wherein the mover clutch has an inclined projection at a rear end, a rolling material being provided between the rear end of the mover clutch and a stationary collar, the rolling material being engaged on the inclined projection to converted rotation of the driving force receiver into forth motion of the mover clutch, a rotational force being transmitted by engagement of a pin of the driving force receiver with a sliding groove of the mover clutch.

11. A roller conveyor as claimed in claim 10 wherein said rolling material comprises a ball.

12. A roller conveyor comprising:

a pair of conveyor frames;

a plurality of rollers which are rotatably mounted between said pair of conveyor frames;

rotation driving means for driving the rollers to convey materials, each of the rollers comprising a roller body which is rotatably mounted on a stationary roller shaft, and a driving force receiver which receives a rotational force from said rotation driving means, said roller conveyor further comprising driving force transmitting means for transmitting said rotational force to said roller body only when said driving force receiver receives the rotational force;

wherein said driving force transmitting means comprises a mover which moves axially of said roller by the rotational force from said driving force receiver, and a receiver connected to the roller body to rotate the roller body by motion of said mover; and wherein said mover has a mover pin projected perpendicular to an axis of the roller, said receiver having a receiver pin perpendicular to the axis of the roller, said receiver being driven by said mover by engagement of the mover pin with the receiver pin.

13. A roller conveyor as claimed in claim 6 wherein the mover has an inclined cam surface at a rear end, the roller shaft having a roller pin, a return coiled spring being wound around the roller shaft, said inclined cam surface being engaged on the roller pin by rotation of the driving force receiver and the mover which rotates therewith, thereby converting the rotation to forward motion to compress said spring, thereby engaging the mover pin with the receiver pin.

14. A roller conveyor comprising:

a pair of conveyor frames;

a plurality of rollers which are rotatably mounted between said pair of conveyor frames;

rotation driving means for driving the rollers to convey materials, each of the rollers comprising a roller body which is rotatably mounted on a stationary roller shaft, and a driving force receiver which receives a rotational force from said rotation driving means, said roller conveyor further comprising driving force transmitting means for transmitting said rotational force to said roller body only when said driving force receiver receives the rotational force;

wherein said driving force transmitting means comprises a mover which moves axially of said roller by the rotational force from said driving force receiver, and a receiver connected to the roller body to rotate the roller body by motion of said mover; and wherein the mover has a front inclined surface, the receiver having a rear inclined surface at the same angle as the front inclined surface of the mover, the front and rear inclined surfaces being opposite to each other, the receiver being driven by the mover by frictional engagement of the front and rear inclined surfaces.

15. A roller conveyor as claimed in claim 14 wherein a roller material is disposed between the driving force receiver and the mover which has a recess which has an inclined portion, the rolling material being received in the recess, rotation of the driving force receiver causing putting the rolling material on the inclined portion of the recess to convert the rotation into forward motion of the mover to lead frictional engagement with the receiver through the two inclined surfaces.

16. A roller conveyor as claimed in claim 15 wherein said rolling material comprises a ball 17. A roller conveyor comprising:

a pair of conveyor frames;

a plurality of rollers which are rotatably mounted between said pair of conveyor frames;

rotation driving means for driving the rollers to convey materials, each of the rollers comprising a roller body which is rotatably mounted on a stationary roller shaft, and a driving force receiver which receives a rotational force from said rotation driving means, said roller conveyor further comprising driving force transmitting means for transmitting said rotational force to said roller body only when said driving force receiver receives the rotational force;

wherein said driving for transmitting means comprises a mover which moves axially of said roller by the rotational force from said driving force receiver, and a receiver connected to the roller body to rotate the roller body by motion of said mover; and wherein a stationary collar is fixed to the stationary roller shaft, an inclined surface of the mover being contacted with an inclined surface of the stationary collar via a rolling material in a pocket of the mover, the two inclined surfaces having the same angle, the mover being in spline engagement with the driving force receiver, the stationary collar being disposed in the driving force receiver via bearings, the receiver being in spline contact with the roller body, rotation of the driving force receiver being converted into forward motion of the mover by the rolling material between the two inclined surfaces, rotation of the roller body being caused by frictional contact between the mover and the receiver.

18. A roller conveyor as claimed in claim 17 wherein a return coiled spring is wound around the stationary roller shaft, frictional contact between the mover and the receiver being released by stop of the driving force receiver through the spring, thereby making the roller body rotatable freely.

19. A roller conveyor as claimed in claim 17 wherein said rolling material comprises a ball.

20. A roller convey comprising:

a pair of conveyor frames;

a plurality of rollers which are rotatably mounted between said pair of conveyor frames;

rotation driving means for driving the rollers to convey materials, each of he rollers comprising a roller body which is rotatably mounted on a stationary roller shaft, and a driving force receiver which receives a rotational force from said rotation driving means, said roller conveyor further comprising driving force transmitting means for transmitting said rotational force to said roller body only when said driving force receiver receives the rotational force;

wherein said driving force transmitting means comprises a mover which moves axially of said roller by the rotational force from said driving force receiver, and a receiver connected to the roller body to rotate the roller body by motion of said mover; and wherein said mover and said receiver comprise a mover clutch and a receiver clutch respectfully, said receiver clutch being driven by said move clutch with engagement of teeth provided on opposing ends of the mover and receiver clutches respectively.

21. A roller conveyor as claimed in claim 20 wherein the mover clutch has an inclined projection at a rear end, a rolling material being provided between the rear end of the mover clutch and a stationary collar, the rolling material being engaged on the inclined projection to convert rotation of the driving force receiver into forth motion of the mover clutch, a rotational force being transmitted by engagement of a pin of the driving force receiver with a sliding groove of the mover clutch.

22. A roller conveyor as claimed in claim 21 wherein said rolling material comprises a ball.

* * * * *